Figure 1:
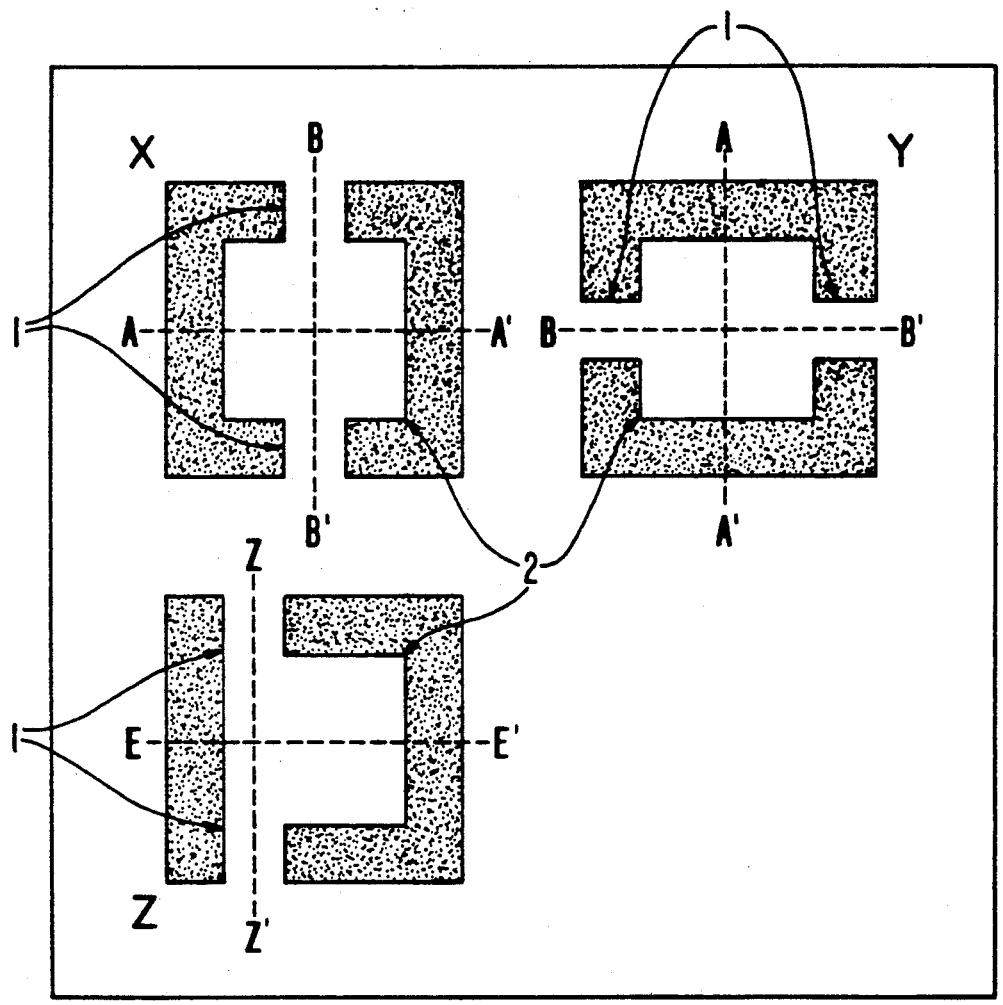

United States Patent [19]

Benecke

[11] Patent Number: 5,065,628

[45] Date of Patent: Nov. 19, 1991

[54] INSTRUMENT FOR MEASURING ACCELERATIONS AND PROCESS OF MAKING THE SAME

[75] Inventor: Wolfgang Benecke, Berlin, Fed. Rep. of Germany

[73] Assignee: Fraunhofer Gesellschaft zur Forderung der angewandten Forschung e.V., Fed. Rep. of Germany

[21] Appl. No.: 477,964

[22] PCT Filed: Dec. 1, 1988

[86] PCT No.: PCT/DE88/00740
§ 371 Date: Jun. 4, 1990
§ 102(e) Date: Jun. 4, 1990

[87] PCT Pub. No.: WO89/05459
PCT Pub. Date: Jun. 15, 1989

Related U.S. Application Data

[63] Continuation of Ser. No. 99,945, Sep. 23, 1987, abandoned.

[30] Foreign Application Priority Data

Dec. 3, 1987 [DE] Fed. Rep. of Germany ....... 3741036

[51] Int. Cl.⁵ ............... G01P 15/08; H01L 21/306; B44C 1/22
[52] U.S. Cl. ................... 73/517 R; 156/648; 156/651; 156/656; 156/657; 156/659.1; 156/662; 29/25.35
[58] Field of Search ............ 156/647, 648, 651, 652, 156/653, 656, 657, 659.1, 661.1, 662; 29/610.1, 620, 621.1, 25.35; 73/510, 514, 516 R, 517 R, 517 B

[56] References Cited

U.S. PATENT DOCUMENTS 4,776,924 10/1988 Delapierre .................... 156/647
4,851,080 7/1989 Howe et al. .................. 156/647

FOREIGN PATENT DOCUMENTS 0244581 11/1987 European Pat. Off. .
0301816 2/1989 European Pat. Off. .
62-118260 5/1987 Japan .
2101336 1/1983 United Kingdom .

OTHER PUBLICATIONS

Henley, "Advances in VLSI Stimulate Solid-State Sensors Market", New Electronics, Aug. 12, 1986, pp. 45, 47–50.

Primary Examiner—William A. Powell
Attorney, Agent, or Firm—Evenson, Wands, Edwards, Lenahan & McKeown

[57] ABSTRACT

Disclosed is an instrument for measuring accelerations, with the aid of which changes in motion in the three axes of space can be measured with selective sensitivity.

In order to detect multi-dimensional changes in motion, three micromechanical sensors, each sensitive to the acceleration in a selected direction, are integrated in a crystal. The sensors are composed of torsion bars having masses eccentrically attached thereto, which, in the event of changes in motion, exercise torques about the axes of the torsion bars. The torques are measured with the aid of integrated piezo-resistances. The planar integration of the acceleration meter permits integrating the evaluation circuit on the same semiconductor surface.

Acceleration meters of this kind are fabricated with the prescribed process in planar technology with the aid of epitaxy, lithography and anisotropic etching methods.

High precision and high miniaturization make this acceleration meter suited for application in overland and aviation navigation and for component positioning in robotry.

12 Claims, 4 Drawing Sheets

INSTRUMENT FOR MEASURING ACCELERATIONS AND PROCESS OF MAKING THE SAME

TECHNICAL FIELD

The present invention relates to an instrument for measuring accelerations, with which the effect of an acceleration on an inert mass is measured. In particular, it relates to an instrument, which can be produced with the aid of microstructure technology. In such instruments, the inert mass is prepared with conventional anisotropic etching processes customary in microstructure technology. The mechanical effect of the acceleration is converted into an electrical signal, which is transmitted to an evaluation circuit.

STATE OF THE ART

Micromechanically integrated acceleration sensors, with the aid of which accelerations between the three axes of space cannot be differenciated, are described in several publications. For example: Davison, J. L., Kerns, D. V. "Silicon Acceleration Technology", in: Proceedings of the 1986 International Conference on Industrial Electronics, Control and Instrumentation", IEEE, New York 1986, pp. 218-222. The individual sensors are made of silicon using planar technology. In order to be able to measure in the three axes of space, three individual sensors have to be arranged in hybrid assembly and atuned to one another, whereby the achievable mechanical precision and the degree of miniaturization are limited.

An instrument for measuring accelerations with discrimination in the three directions in space is known from the published British Patent Application GB 2 174 500 A. In this instrument, the sensor elements are not arranged in a common crystal surface, but on the front, respectively rear, side of the substrate. This presents the difficult task of electrically connecting the different sensor elements, which the aforegoing publication proposes to solve with wire connections, respectively etched through holes with conductor paths. In production, this requires many procedural steps.

DESCRIPTION OF THE INVENTION

The object of the present invention is to provide an instrument for measuring accelerations, with the aid of which it should be possible to differenciate between accelerations in the three axes of space, which has a highly selective sensitivity with regard to the three axes of space and which can be produced with as few procedural steps as possible.

This object is solved with an instrument of this class by means of the characterizing features of claim 1 hereto, and by means of a process for its fabrication, which is set forth in claim 9 hereto.

A high degree of miniaturization and high mechanical precision are obtained by the planar integration of three sensor elements for the three axes of space in a crystal surface layer. Simultaneously, this solution offers the possibility of connecting the sensor elements with an electronic evaluation circuit, which can be integrated on the same substrate.

Having high precision and small dimensions, the invented instrument can be utilized, in particular, for detecting multi-dimensional courses of motion in aviation, overland traffic, in robotry and in the field of biomedicine.

Advantageous improvements of the present invention are set forth in the claims 2 to 8 and 10 to 12 hereto.

In the improvement of claim 2 hereto, the directions of sensitivity are practically perpendicular to one another. By this means, the acceleration force acting in a random direction in space is simply divided into the three vertical components of a predeterminable Cartesian coordinate system.

Especially advantageous, is an embodiment according to claim 3 hereto, in which the reset elements are designed as torsion bars as a torsion bar having the inert mass arranged eccentrically thereon fixes a preferred direction for the sensitivity of a sensor in a simple manner. Claims 4 and 5 describe an embodiment which yields a very cost-favorable fabrication of the accelerator meter by utilization materials very conventional in semiconductor production.

An acceleration force causes the inert mass to lurch and thereby produces mechanical tension in the torsion bar, which is taken as the measure of the acceleration force. According to claim 6 hereto, the mechanical tension in the torsion bar is detected by means of integrated resistances while utilizing the piezo-resistive effect in silicon. This embodiment can be realized with the usual methods of semiconductor technology (e.g. ion implantation). It offers the advantage that the electrical contacts of the integrated resistances of all the sensor elements are arranged in one plane. According to claim 7 hereto, a circuit for evaluating the electric signals is integrated in the same surface. The sensor elements and the evaluation circuit can subsequently be electrically connected to one another by simple conductor paths.

Suited or particularly great mesuring sensitivity is the embodiment of claim 8 hereto, according to which the mechanical tension is indirectly determined by capacitive signal conversion. For this purpose, by way of illustrative, areas of the surfaces of the inert masses can be provided with metal layers, which form condensers of variable capacity with immobile metal plates arranged on the opposite side. As the capacity of these condensers depends on the lurching of the inert mass, it represents a measure of the acceleration force.

A BRIEF DESCRIPTION OF THE DRAWINGS

A preferred embodiment of the present invention is made more apparent in the following section using the accompanying drawings. The drawings are not to scale for reasons of better illustration.

Figure 2:
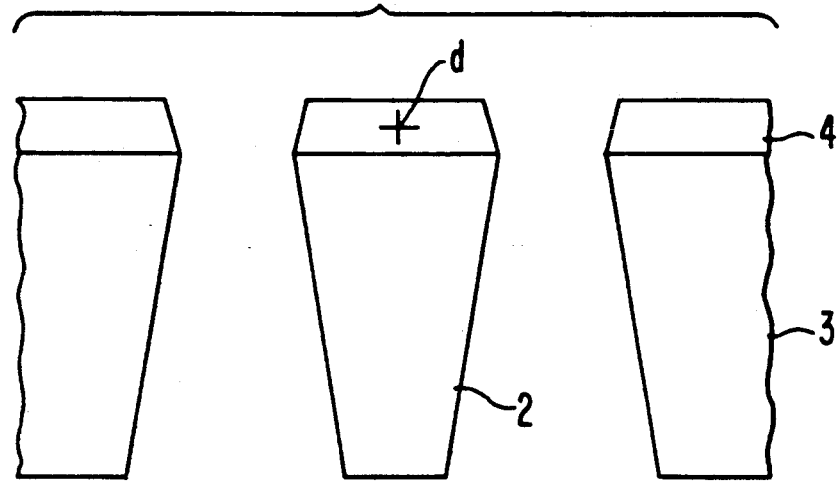
Figure 3:
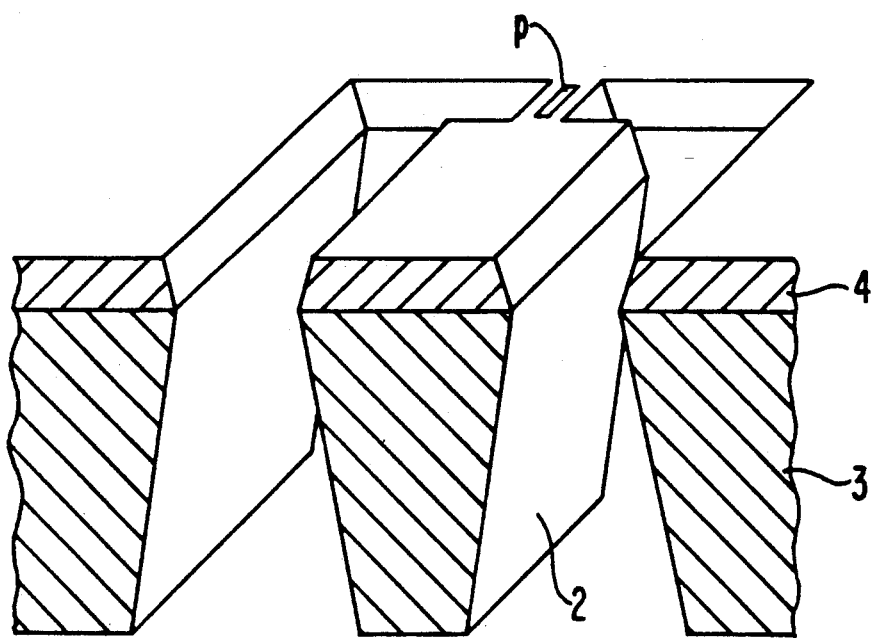
Figure 4:
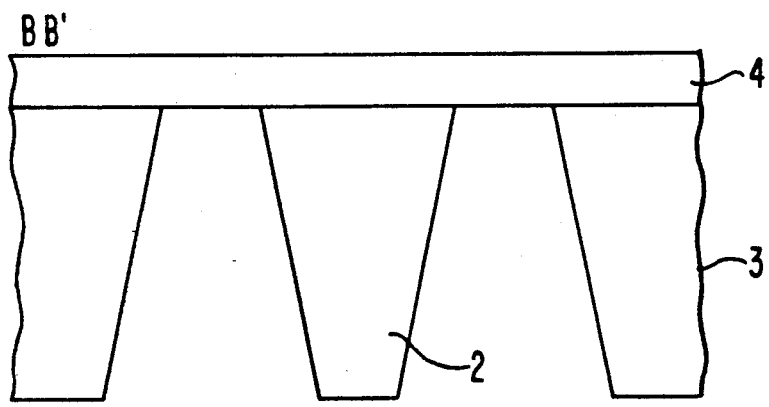
Figure 5:
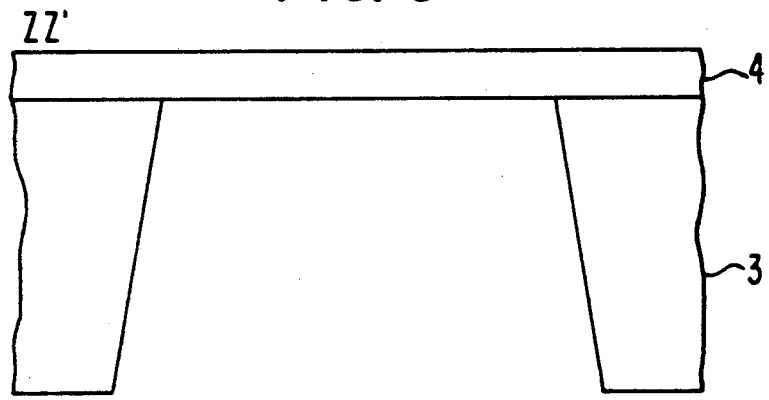
Figure 6:
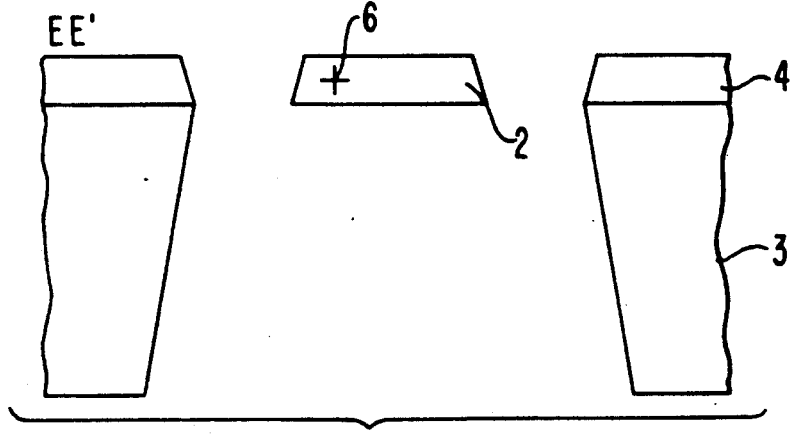
Figure 7A:
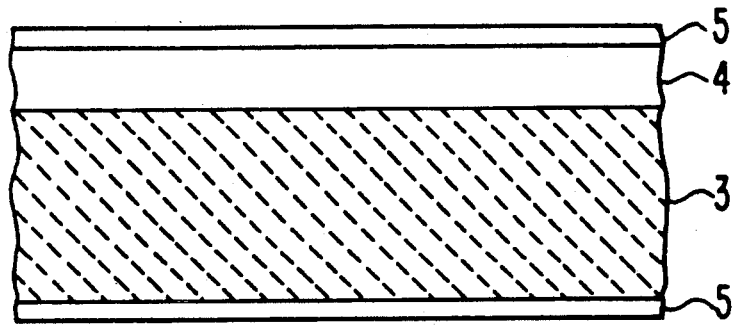
Figure 7B:
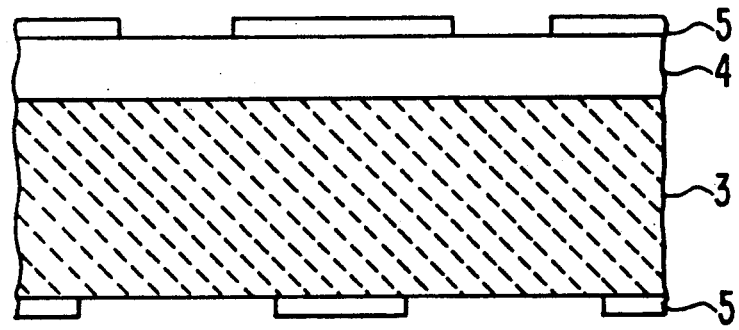
Figure 7C:
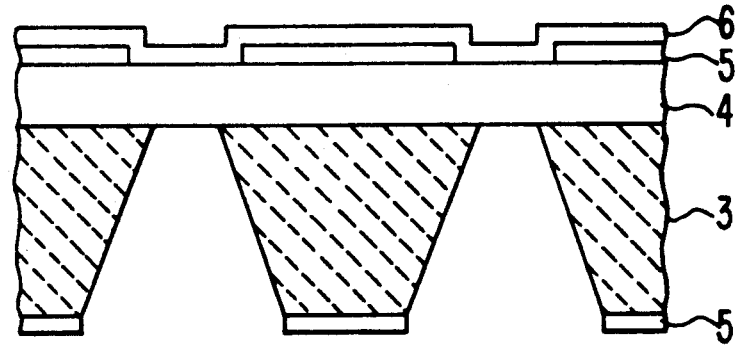
Figure 7D:
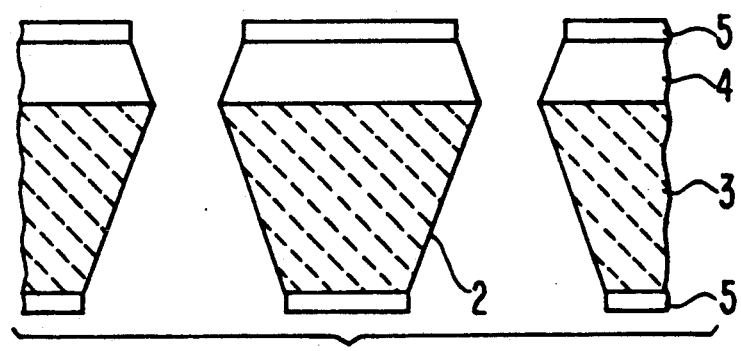

Shown is in:

FIG. 1 three planar monolithically integrated acceleration sensors in a schematic representation of a top view, FIG. 2 a section through the plane designated AA' in FIG. 1, FIG. 3 a spacial representation for the sensor element cut in the plane AA', FIG. 4 a section through the plane designated BB' in FIG. 1, FIG. 5 a section through the plane designated ZZ' in FIG. 1, FIG. 6 a section through the plane designated EE' in FIG. 1, FIGS. 7(A-D) a schematic representation of the course of the invented process of an acceleration meter according to FIG. 1.

MODES OF CARRYING OUT THE INVENTION

The invented arrangement consists of two identical sensor elements turned 90° toward each other, which are designated X and Y in FIG. 1 and serve to detect accelerations in the drawing plane, and a sensor element Z, which reacts to changes in motion perpendicular to the drawing plane. Each sensor element is composed of an inert mass, on which the acceleration force acts, a reset element and a converter for converting the mechanical action into an electric signal. The reset elements of the three sensors are torsion bars 1, the axes of rotation of which d in the case of the sensor elements X and Y lie in the cutting plane BB' and in the case of the sensor element Z in the cutting plane ZZ'. In each case, the torsion bars 1 bear an inert mass 2, the center of gravity of which lies far outside the axis of rotation d. The arrangement of the inert masses 2 of the identical sensor elements X and Y is shown in the sectional drawings FIG. 2, FIG. 3, and FIG. 4 and in FIG. 5 and FIG. 6 that of sensor element Z, with the course of the cutting planes corresponding to the established ones in FIG. 1. The inert masses 2 of sensor elements X and Y are composed of etched-free parts of the wafer substrate 3 and the epitaxy layer 4 and extend over the entire thickness (about 500 $\mu$m) of the wafer, whereas the inert mass of sensor element Z (FIG. 6) only consists of the etched free-part of the epitaxy layer 4 in order to ensure a selective sensitivity exclusively perpendicular to the wafer surface.

Due to the eccentric position of the center of gravity of the masses, masses 2 exert torques about the torsion axes d with changes in motion. The active torques are determined by measuring the mechanical tensions in the torsion bars 1. For this purpose, with the aid of ion implantation, piezo-resistances p are integrated as mechano-electric converters (FIG. 3).

An above-described micro-mechanical, integrated arangement for measuring accelerations can be fabricated according to claim 9 hereto by using an anisotropic etching process, the procedure of which is schematically shown in FIG. 7. The base material in FIG. 7A consists of a p-doped silicon wafer 3 (in 100)-orientation, on the front side of which an approx. 10 $\mu$m thick n-epitaxy layer 4 is precipitated and as is subsequently on the front and rear sides of passivation layers 5 of silicon nitride. With the aid of photolithography, ion implantation and diffusion, piezo-resistances are produced on the front side of the wafer for converting the signal. Subsequently, the structure of the acceleration sensors are placed on the front and rear sides of the wafer with the aid of photolithography and etched out of the passivation layer (FIG. 7B). The width of the torsion bar is about 60 to 100 $\mu$m, that of the masses several hundred micrometers. A metal layer 6 is put on the front side and the wafer is electro-chemcially etched from the rear side in a KOH-H$_2$O etching solution, see FIG. 7C. The etching procedure stops automatically at the pn-transition. Following etching, the rear side of the wafer is passivated and the metal layer 6 is removed from the front side. Anisotropic etching the front side of the wafer completes the structure of the sensor elements, see FIG. 7D. Finally the passivation layers 5 of the wafer surfaces 5 are removed. With the aid of this process, several hundred instruments for measuring accelerations can be fabricated simultaneously on a silicon wafer.

In an embodiment of the invented process, not made more apparent herein, the sensors structures are produced by means of X-ray depth lithography and galvanic casting.

What is claimed is:

1. An instrument for measuring accelerations, comprising a reset element, a mechano-electric converter, and three micromechanical sensors, each consisting of an inert mass and sensitive to a motion in one direction to define multiple directions of sensitivity, integrated in a crystal surface layer, wherein the multiple directions of sensitivity of the sensors point in different directions and do not lie in one plane.

2. An instrument for measuring accelerations according to claim 1, wherein said three directions of sensitivity are approximately perpendicular to one another.

3. An instrument for measuring accelerations according to claim 2, wherein said reset element of each sensor is as torsion bar onto which the inert mass is placed, the center of gravity of which is non-coincident with the axis of rotation of the torsion bar.

4. An instrument for measuring accelerations according to claim 3, wherein said torsion bars are made of silicon.

5. An instrument for measuring accelerations according to claim 4, wherein the base material of said instrument is a silicon mono crystal.

6. An instrument for measuring accelerations according to claim 5, wherein said mechano-electric converters are designed as piezo-resistive resistances, which are integrated utilizing the piezo-resistive effect in silicon for measuring the mechanical tensions in the torsion bars.

7. An instrument for measuring accelerations according to claim 6, wherein said sensor elements are integrated together with an evaluation circuit on the same crystal surface.

8. An instrument according to claim 3, wherein said measuring of the mechanical tensions in the torsion bars occurs indirectly by a capacitive method.

9. A process for making an instrument for measuring accelerations having a reset element, a mechano-electric converter and three micromechanical sensors, each consisting of an inert mass and sensitive to a motion in one direction to define multiple directions of sensitivity, integrated in a crystal surface layer, wherein the multiple directions of sensitivity of the sensors point in different directions and do not lie in one plane, comprising the process steps of:

precipitating a semiconducting epitaxy layer having impurities of one kind onto a silicon wafer doped with impurities of a second kind to form a pn-transition, precipitating a passivation layer of silicon nitride on the silicon wafer, integrating piezo-resistances on a side of the wafer, photolithographic structuring on the front and rear sides of the wafer, etching the passivation layer, metallizing said front side of said wafer, anisotropic electro-chemical etching of said rear side of said wafer in a KOH-H$_2$O etching solution, with the etching process stopping automatically at the pn-transition, passivating said rear side of said wafer, removing said metallizing layer from said front side, anisotropic etching said epitaxy layer on said front side of said wafer, and removing said passivation layer on said rear side.

10. A process for making an instrument according to claim 9, wherein, in step A of said process silicon oxide is precipitated as said passivation layer.

11. A process for making an instrument according to claim 9, wherein said semiconducting epitaxy layer is replaced in said step A of said process by a succession of layers composed of high dropped p- and a low doped layer.

12. A process for making a micromechanical, integrated acceleration meter according to claim 9, wherein the structure of said sensors is built up on the substrate with the aid of X-ray depth lithography and galvanic casting.

* * * * *